(12) United States Patent
Hsieh et al.

(10) Patent No.: US 11,624,974 B2
(45) Date of Patent: Apr. 11, 2023

(54) PROJECTION APPARATUS AND ILLUMINATION SYSTEM

(71) Applicant: Coretronic Corporation, Hsin-Chu (TW)

(72) Inventors: Wan-Ting Hsieh, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/387,987

(22) Filed: Jul. 28, 2021

(65) Prior Publication Data

US 2022/0128893 A1 Apr. 28, 2022

(30) Foreign Application Priority Data

Oct. 26, 2020 (CN) .......................... 202011153650.1

(51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *G02B 27/0938* (2013.01);
(Continued)

(58) Field of Classification Search
None
See application file for complete search history.

(56) References Cited

U.S. PATENT DOCUMENTS

| 6,467,910 B1 | 10/2002 | Sato |
| 2014/0176914 A1 | 6/2014 | Mueller |

(Continued)

FOREIGN PATENT DOCUMENTS

| CN | 103792765 | 5/2014 |
| CN | 104641289 | 5/2015 |

(Continued)

OTHER PUBLICATIONS

"Search Report of Europe Counterpart Application", dated Feb. 15, 2022, p. 1-p. 8.

(Continued)

*Primary Examiner* — Bao-Luan Q Le
*Assistant Examiner* — Danell L Owens
(74) *Attorney, Agent, or Firm* — JCIPRNET (57) ABSTRACT

A projection apparatus and an illumination system that includes an excitation light source, a beam filter module, a wavelength conversion module and a homogenizing element are provided. The beam filter module includes a light effective region and is disposed on a transmission path of an excitation beam. The wavelength conversion module includes a wavelength conversion region and is disposed on a transmission path of the excitation beam reflected by the light effective region. The wavelength conversion region converts the excitation beam into a conversion beam. The conversion beam from the wavelength conversion module passes through the light effective region and then forms at least one color light. An optical axis of the excitation beam incident on the light effective region and a normal line of the light effective region are respectively not parallel to a central axis of the homogenizing element.

20 Claims, 6 Drawing Sheets

(51) Int. Cl.
  *G02B 27/14* (2006.01)
  *G02B 27/09* (2006.01)
  *G02B 27/10* (2006.01)
  *G03B 33/14* (2006.01)
  *G03B 33/12* (2006.01)

(52) U.S. Cl.
  CPC ......... *G02B 27/102* (2013.01); *G02B 27/141* (2013.01); *G03B 21/208* (2013.01); *G03B 21/2066* (2013.01); *G03B 33/12* (2013.01)

(56) References Cited

U.S. PATENT DOCUMENTS

| | | | |
|---|---|---|---|
| 2015/0253653 A1* | 9/2015 | Fujita | G03B 21/204 353/31 |
| 2018/0239233 A1 | 8/2018 | Kado | |
| 2019/0384150 A1 | 12/2019 | Tsai | |
| 2019/0391472 A1 | 12/2019 | Akiyama | |
| 2020/0019049 A1* | 1/2020 | Liu | G03B 21/204 |
| 2020/0201154 A1* | 6/2020 | Sugiyama | G03B 21/2066 |

FOREIGN PATENT DOCUMENTS

| | | |
|---|---|---|
| CN | 207817393 | 9/2018 |
| CN | 108761981 | 11/2018 |
| CN | 208547803 | 2/2019 |
| CN | 110297384 | 10/2019 |
| CN | 110703552 | 1/2020 |
| EP | 2980622 | 2/2016 |
| EP | 3594747 | 1/2020 |
| TW | I293716 | 2/2008 |
| WO | 2014046219 | 3/2014 |

OTHER PUBLICATIONS

"Office Action of China Counterpart Application", dated Jan. 12, 2023, p. 1-10.

* cited by examiner

PROJECTION APPARATUS AND ILLUMINATION SYSTEM

CROSS-REFERENCE TO RELATED APPLICATION

This application claims the priority benefit of China application serial no. 202011153650.1, filed on Oct. 26, 2020. The entirety of the above-mentioned patent application is hereby incorporated by reference herein and made a part of this specification.

BACKGROUND

Technical Field

The disclosure relates to an optical apparatus and an optical system, in particular to a projection apparatus and an illumination system.

Description of Related Art

In a traditional projection apparatus, the excitation beam is transmitted to the wavelength conversion module through the beam splitting element, multiple lenses, and multiple reflecting mirrors. The wavelength conversion module converts the excitation beam into the conversion beam, and the conversion beam is transmitted to the beam filter module through the beam splitting element and other lenses. Since too many optical elements are used in the illumination system, the illumination system has problems such as difficulty in assembly, poor accuracy, and difficulty in size reduction.

The information disclosed in this "BACKGROUND" section is only for enhancement of understanding of the background of the described technology and therefore it may contain information that does not form the prior art that is already known to a person of ordinary skill in the art. Further, the information disclosed in this "BACKGROUND" section does not mean that one or more problems to be resolved by one or more embodiments of the disclosure was acknowledged by a person of ordinary skill in the art.

SUMMARY

The disclosure provides an illumination system and a projection apparatus, which reduce the number of optical elements used.

Other objectives and advantages of the disclosure may be further understood from the technical features disclosed in the disclosure.

In order to achieve at least one of the objects or other objects, an embodiment of the disclosure provides an illumination system configured to provide an illumination beam. The illumination system includes an excitation light source, a beam filter module, a wavelength conversion module and a homogenizing element. The excitation light source is configured to emit an excitation beam. The beam filter module includes a light effective region and is disposed on a transmission path of the excitation beam from the excitation light source. The wavelength conversion module includes a wavelength conversion region and is disposed on a transmission path of the excitation beam reflected by the light effective region of the beam filter module. The wavelength conversion region of the wavelength conversion module is configured to convert the excitation beam into a conversion beam and reflect the conversion beam. The wavelength of the conversion beam is different from the wavelength of the excitation beam. The homogenizing element is disposed on a transmission path of the excitation beam passing through the beam filter module. The conversion beam from the wavelength conversion module passes through the light effective region of the beam filter module and then forms at least one color light. The homogenizing element is disposed on a transmission path of the at least one color light. An optical axis of the excitation beam incident on the light effective region and a normal line of the light effective region are respectively not parallel to a central axis of the homogenizing element. The excitation beam and the at least one color light form the illumination beam.

In order to achieve at least one of the objects or other objects, an embodiment of the disclosure provides a projection apparatus, which includes the above-mentioned illumination system, a light valve, and a projection lens. The light valve is disposed on a transmission path of the illumination beam and converts the illumination beam into an image beam. The projection lens is disposed on a transmission path of the image beam.

Based on the above, the embodiments of the disclosure have at least one of the following advantages or effects. In the embodiments of the illumination system and the projection apparatus of the disclosure, the excitation beam from the excitation light source may be transmitted to the wavelength conversion module through the reflection of the light effective region of the beam filter module and converted into the conversion beam by the wavelength conversion module. The conversion beam is transmitted to the light effective region of the beam filter module through the reflection of the wavelength conversion module, and passes through the light effective region of the beam filter module and then forms at least one color light. Since the number of the optical elements configured in the illumination system is effectively reduced, at least one of the problems of difficulty in assembly, poor accuracy, and difficulty in size reduction may be improved.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1A:
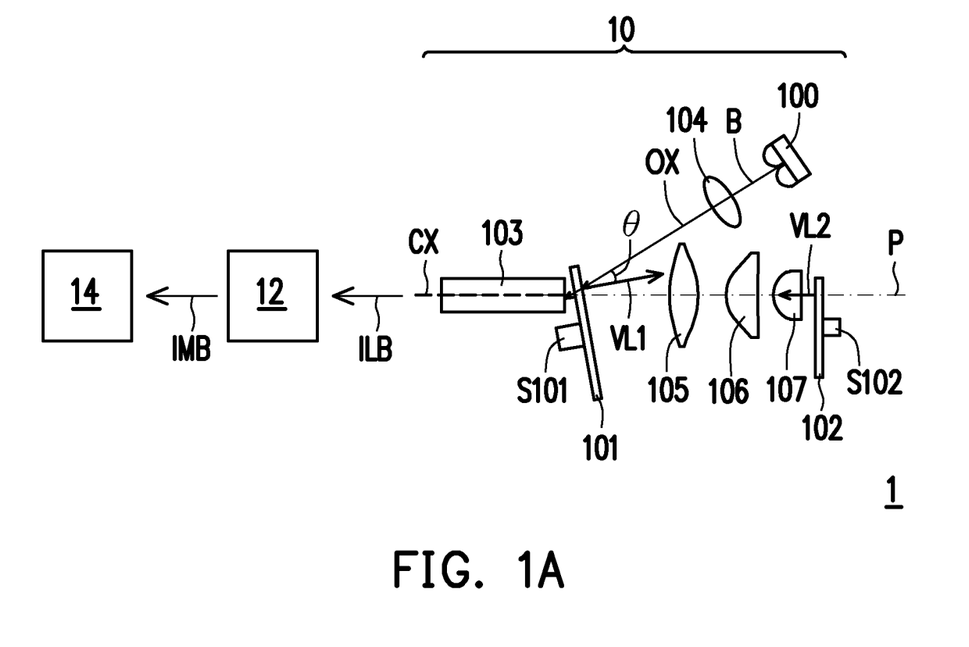
FIG. 1A and FIG. 1B are respectively schematic top views of a projection apparatus according to the first embodiment of the disclosure in different periods.
Figure 1B:
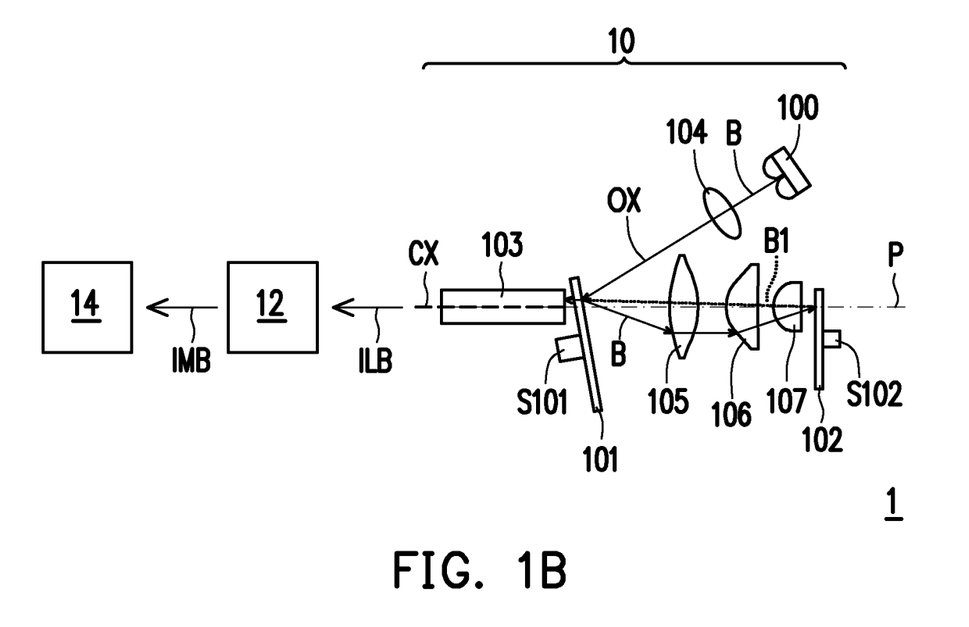
Figure 1C:
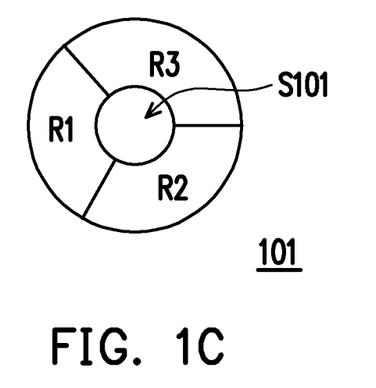
FIG. 1C and FIG. 1D are respectively schematic front views of a beam filter module and a wavelength conversion module in FIG. 1A.
Figure 1D:
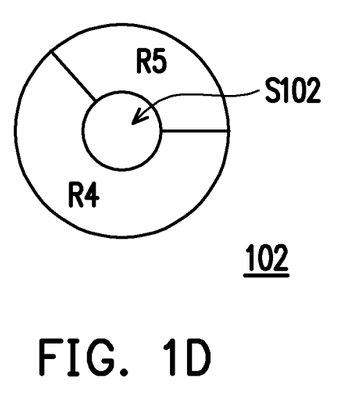

FIG. 1A and FIG. 1B are respectively schematic top views of a projection apparatus according to the first embodiment of the disclosure in different periods. FIG. 1C and FIG. 1D are respectively schematic front views of a beam filter module and a wavelength conversion module in FIG. 1A. Referring to FIG. 1A to FIG. 1D, a projection apparatus 1 according to the first embodiment of the disclosure may include an illumination system 10, a light valve 12, and a projection lens 14.

The illumination system 10 is configured to provide an illumination beam ILB. In detail, the illumination system 10 may include an excitation light source 100, a beam filter module 101, a wavelength conversion module 102, and a homogenizing element 103. The excitation light source 100 is configured to provide an excitation beam B. For example, the excitation light source 100 includes multiple light-emitting elements. The multiple light-emitting elements may include multiple laser diodes, multiple light-emitting diodes, or a combination of the above two light-emitting elements.

The beam filter module 101 is disposed on a transmission path of the excitation beam B from the excitation light source 100. As shown in FIG. 1C, the beam filter module 101 may include a light effective region R1, a light effective region R2, and a light transmissive region R3. However, the number of the light effective regions or the light transmissive regions may be changed according to requirements and is not limited to the above.

The light effective region R1, the light effective region R2, and the light transmissive region R3 are disposed along a circumferential direction of the beam filter module 101 to surround a shaft S101 of the beam filter module 101. The beam filter module 101 is configured to rotate around the shaft S101 so that the light effective region R1, the light effective region R2, and the light transmissive region R3 alternately cut into the transmission path of the excitation beam B from the excitation light source 100. The light effective region R1 and the light effective region R2 are configured to reflect the excitation beam B and allow at least one color light other than the excitation beam B (such as a blue beam) to pass. For example, the light effective region R1 is a red beam filter region configured to reflect the excitation beam B and allow a red beam to pass, and the light effective region R2 is a green beam filter region configured to reflect the excitation beam B and allow a green beam to pass. The light effective region R1 may be disposed with a coating that reflects the excitation beam B and a red filter that allows the red beam to pass. The light effective region R2 may be disposed with the coating that reflects the excitation beam B and a green filter that allows the green beam to pass. The light transmissive region R3 is configured to allow at least part of the excitation beam B to pass. For example, the light transmissive region R3 may be disposed with a blue filter or without any filter. In some embodiments, the light transmissive region R3 may be disposed with an anti-reflection layer to reduce the light loss caused by interface reflection.

The wavelength conversion module 102 is disposed on a transmission path of the excitation beam B reflected by the light effective region (such as the light effective region R1 or the light effective region R2) of the beam filter module 101. As shown in FIG. 1D, the wavelength conversion module 102 may include a wavelength conversion region R4 and a non-wavelength conversion region R5. However, the number of the wavelength conversion regions and the non-wavelength conversion regions may be changed according to requirements and is not limited to the above.

The wavelength conversion region R4 and the non-wavelength conversion region R5 are disposed along a circumferential direction of the wavelength conversion module 102 to surround a shaft S102 of the wavelength conversion module 102. The wavelength conversion region R4 is configured to convert the excitation beam B (such as the blue beam) reflected from the light effective region R1 or R2 of the beam filter module 101 into a conversion beam B1 (such as the red beam, the green beam or a yellow beam), and then the wavelength conversion region R4 reflects the conversion beam B1 back to the beam filter module 101. For example, the wavelength conversion region R4 may be disposed with a wavelength conversion layer that converts the excitation beam B into the conversion beam B1 (such as the yellow beam) and a reflection layer (such as a metal carrier plate or a metal coating) that reflects the conversion beam B1. The material of the wavelength conversion layer may include a phosphor layer, a quantum dot layer, or a combination of the above two materials, but is not limited thereto. In some embodiments, the material of the wavelength conversion layer may further include light diffusion particles. The wavelength conversion layer is disposed in the wavelength conversion region R4 and is not disposed in the non-wavelength conversion region R5. That is, the wavelength conversion layer does not cover the non-wavelength conversion region R5. The non-wavelength conversion region R5 may have light diffusion characteristics. For example, the non-wavelength conversion region R5 may be disposed with a diffuser, but is not limited thereto. In this embodiment, the wavelength conversion module 102 uses a yellow beam conversion region as an example. However, in other embodiments, the wavelength conversion module 102 may also include multiple wavelength conversion regions such as at least two of a red beam conversion region that converts the excitation beam B into the red beam, a green beam conversion region that converts the excitation beam B into the green beam, and the yellow beam conversion region that converts the excitation beam B into the yellow beam. In other embodiments, the wavelength conversion module 102 may only include the wavelength conversion region without being disposed with the non-wavelength conversion region. For example, the wavelength conversion module 102 may only include multiple wavelength conversion regions such as at least two of the red beam conversion region that converts the excitation beam B into the red beam, the green beam conversion region that converts the excitation beam B into the green beam, and the yellow beam conversion region that converts the excitation beam B into the yellow beam.

The wavelength conversion module 102 is configured to rotate around the shaft S102, and the wavelength conversion module 102 is configured to rotate synchronously with the beam filter module 101. In detail, in a first period, the light transmissive region R3 of the beam filter module 101 and the non-wavelength conversion region R5 of the wavelength conversion module 102 cut into a light irradiation region synchronously. Specifically, the light transmissive region R3 of the beam filter module 101 cuts into the transmission path of the excitation beam B from the excitation light source 100. In the first period, as shown in FIG. 1A, most of the excitation beam B transmitted to the beam filter module 101 passes through the light transmissive region R3 of the beam filter module 101 without being transmitted to the wavelength conversion module 102. The homogenizing element 103 is disposed on a transmission path of the excitation beam B passing through the beam filter module 101 to improve the uniformity of the beam output from the illumination system 10. For example, the homogenizing element 103 is a light integrating rod, but is not limited thereto. The excitation beam B passing through the beam filter module 101 then passes through the homogenizing element 103 and then is output from the illumination system 10. In other words, in the first period, the beam output from the illumination system 10 is the blue beam.

In a second period, the light effective region R2 of the beam filter module 101 and the wavelength conversion region R4 of the wavelength conversion module 102 cut into the light irradiation region synchronously. Specifically, the light effective region R2 of the beam filter module 101 cuts into the transmission path of the excitation beam B from the excitation light source 100. As shown in FIG. 1B, the excitation beam B transmitted to the beam filter module 101 is reflected by the light effective region R2 of the beam filter module 101. The wavelength conversion region R4 (such as the yellow beam conversion region) of the wavelength conversion module 102 cuts into a transmission path of the excitation beam B reflected by the light effective region R2, and the wavelength conversion region R4 of the wavelength conversion module 102 converts the excitation beam B into the conversion beam B1 (such as the yellow beam) and reflects the conversion beam B1. The conversion beam B1 reflected by the wavelength conversion region R4 of the wavelength conversion module 102 is transmitted to the light effective region R2 of the beam filter module 101. The green beam of the conversion beam B1 passes through the light effective region R2 (such as the green beam filter region) of the beam filter module 101, and the red beam of the conversion beam B1 is filtered out by the light effective region R2 of the beam filter module 101. In other words, the conversion beam B1 from the wavelength conversion module 102 passes through the light effective region R2 of the beam filter module 101 and then forms a color light (such as the green beam). The homogenizing element 103 is disposed on a transmission path of the green beam. The green beam passing through the beam filter module 101 then passes through the homogenizing element 103 and then is output from the illumination system 10. In other words, in the second period, the beam output from the illumination system 10 is the green beam.

In a third period, the light effective region R1 of the beam filter module 101 and the wavelength conversion region R4 of the wavelength conversion module 102 cut into the light irradiation region synchronously. Specifically, the light effective region R1 of the beam filter module 101 cuts into the transmission path of the excitation beam B from the excitation light source 100. As shown in FIG. 1B, the excitation beam B transmitted to the beam filter module 101 is reflected by the light effective region R1 of the beam filter module 101. The wavelength conversion region R4 (such as the yellow beam conversion region) of the wavelength conversion module 102 cuts into a transmission path of the excitation beam B reflected by the light effective region R1, and the wavelength conversion region R4 of the wavelength conversion module 102 converts the excitation beam B into the conversion beam B1 (such as the yellow beam) and reflects the conversion beam B1. The conversion beam B1 reflected by the wavelength conversion region R4 of the wavelength conversion module 102 is transmitted to the light effective region R1 of the beam filter module 101. The red beam of the conversion beam B1 passes through the light effective region R1 (such as the red beam filter region) of the beam filter module 101, and the green beam of the conversion beam B1 is filtered out by the light effective region R1 of the beam filter module 101. In other words, the conversion beam B1 from the wavelength conversion module 102 passes through the light effective region R1 of the beam filter module 101 and then forms a color light (such as the red beam). The homogenizing element 103 is disposed on a transmission path of the red beam. The red beam passing through the beam filter module 101 then passes through the homogenizing element 103 and then is output from the illumination system 10. In other words, in the third period, the beam output from the illumination system 10 is the red beam.

According to the above, the illumination system 10 may have multiple time periods (such as the first period to the third period) according to the number of the light effective regions and the light transmissive regions in the beam filter module 101, and the illumination system 10 outputs different color beams in different periods (such as the blue beam, the green beam, and the red beam). These different color beams form the illumination beam ILB shown in FIG. 1A and FIG. 1B. In this embodiment, the illumination system 10 has three periods, and the illumination system 10 respectively outputs the blue beam, the green beam, and the red beam in the three periods. However, the number of the periods, the colors output in each period, the order of output colors, and the duration of each period may be changed according to requirements.

According to different requirements, the illumination system 10 may further include other elements. For example, the illumination system 10 may further include multiple lenses (such as a lens 104, a lens 105, a lens 106, and a lens 107) so as to converge or collimate the beam.

The lens 104 is disposed on the transmission path of the excitation beam B from the excitation light source 100, and the beam filter module 101 is disposed on a transmission path of the excitation beam B from the lens 104. The lens 105 to the lens 107 are disposed between the beam filter module 101 and the wavelength conversion module 102, and the lens 105 to the lens 107 are located outside the transmission path of the excitation beam B from the excitation light source 100. As shown in FIG. 1A or FIG. 1B, the lens 105 to the lens 107 are not located on a transmission path of the excitation beam B transmitted from the excitation light source 100 to the beam filter module 101. Specifically, the lens 105 is disposed on a transmission path of the excitation beam B reflected from the beam filter module 101. The lens 106 is disposed on a transmission path of the excitation beam B from the lens 105. The lens 107 is disposed on a transmission path of the excitation beam B from the lens 106. The wavelength conversion module 102 is disposed on a transmission path of the excitation beam B from the lens 107. The lens 107 is also disposed on a transmission path of the conversion beam B1 reflected by the wavelength conversion region R4 of the wavelength conversion module 102. The lens 106 is also disposed on a transmission path of the conversion beam B1 from the lens 107. The lens 105 is also disposed on a transmission path of the conversion beam B1 from the lens 106. The beam filter module 101 is also disposed on a transmission path of the conversion beam B1 from the lens 105.

The light valve 12 is disposed on a transmission path of the illumination beam ILB and converts the illumination beam ILB into an image beam IMB. For example, the light valve 12 may be a digital micro-mirror device (DMD), a liquid-crystal-on-silicon panel (LCOS panel) or a transmissive liquid crystal panel, but is not limited thereto.

The projection lens 14 is disposed on a transmission path of the image beam IMB to project the image beam IMB onto the screen or other imagable objects. The projection lens 14 may be an existing projection lens, which will not be described in detail here.

In this embodiment, by adjusting the relative position relationship of the homogenizing element 103, the excitation light source 100, and the beam filter module 101, an optical axis OX of the excitation beam B incident on the light effective region (or the light transmissive region) of the beam filter module 101 and a normal line VL1 of the light effective region (or the light transmissive region) of the beam filter module 101 are respectively not parallel to a central axis CX of the homogenizing element 103. For example, the beam filter module 101 may be disposed obliquely upstream of the homogenizing element 103 (the angle between the normal line VL1 and the central axis CX may be greater than 0 degree and smaller than or equal to 45 degrees, and for example, 15 degrees), and the excitation light source 100 is disposed obliquely upstream of the beam filter module 101. The homogenizing element 103, the beam filter module 101, and the wavelength conversion module 102 may be arranged on a linear path P, and the excitation light source 100 may be located outside the linear path P, so that the excitation beam B from the excitation light source 100 is incident obliquely on the beam filter module 101. That is, an angle θ between the normal line VL1 of the light effective region of the beam filter module 101 and the optical axis OX of the excitation beam B of the excitation light source 100 is not equal to 0. The linear path P is, for example, parallel to the central axis CX of the homogenizing element 103. In this way, the excitation beam B from the excitation light source 100 may be transmitted to the wavelength conversion module 102 through the reflection of the light effective region of the beam filter module 101 and converted into the conversion beam B1 (such as the yellow beam) by the wavelength conversion module 102. The conversion beam B1 is transmitted to the light effective region of the beam filter module 101 through the reflection of the wavelength conversion module 102, and passes through the light effective region of the beam filter module 101 and then forms at least one color light (such as the green beam or the red beam). Since the excitation beam B from the excitation light source 100 is transmitted to the wavelength conversion module 102 without passing through a beam splitting element and multiple reflecting mirrors, the number of optical elements configured in the illumination system 10 is effectively reduced, thereby improving at least one of the problems such as difficulty in assembly, poor accuracy, and difficulty in size reduction.

In some embodiments, as shown in FIG. 1A, a normal line VL2 (shown in FIG. 1A) of the wavelength conversion region (or the non-wavelength conversion region) may be parallel to the central axis CX of the homogenizing element 103, so that the normal line VL1 of the light effective region (or the light transmissive region) of the beam filter module 101 and the normal line VL2 of the wavelength conversion region (or the non-wavelength conversion region) of the wavelength conversion module 102 may not be parallel nor perpendicular.

In the following embodiments, the same or similar elements are denoted by the same or similar reference numerals, and the related descriptions (such as setting relationships, materials, or effects) of the same elements will not be repeated below.

Figure 2:
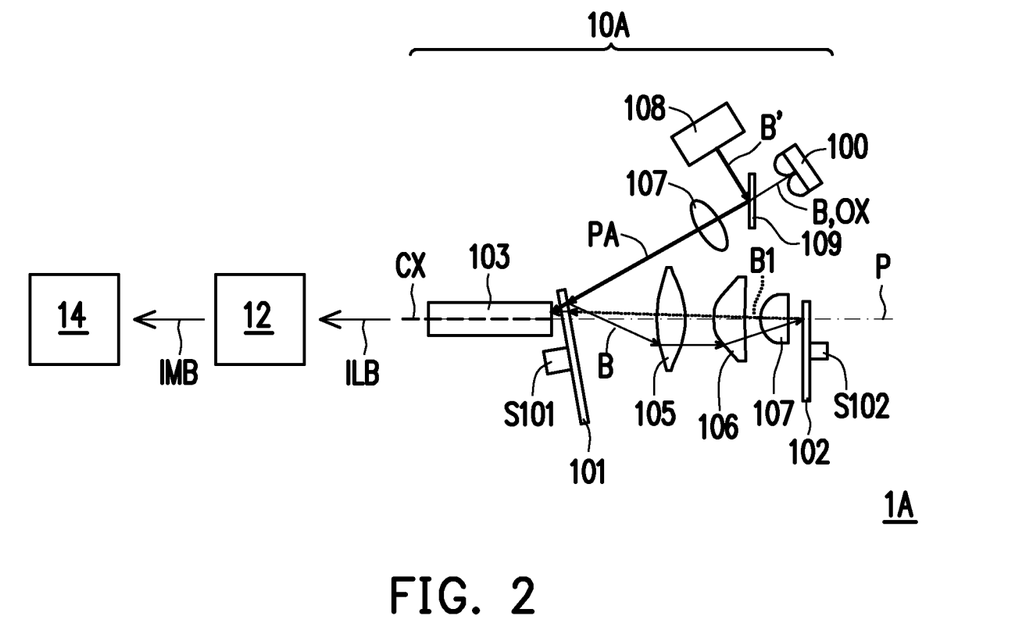
FIG. 2 is a schematic top view of a projection apparatus according to the second embodiment of the disclosure.

FIG. 2 is a schematic top view of a projection apparatus according to the second embodiment of the disclosure. Referring to FIG. 2, the main differences between a projection apparatus 1A of the second embodiment and the projection apparatus 1 of FIG. 1B are described as follows. In the projection apparatus 1A, an illumination system 10A further includes an auxiliary light source 108 and a light combining element 109.

The auxiliary light source 108 is configured to emit an auxiliary beam B'. The wavelength of the auxiliary beam B' is different from the wavelength of the excitation beam B. For example, the auxiliary light source 108 is a red light source, and the auxiliary beam B' is a red beam. The auxiliary light source 108 may be, for example, a laser diode or a light-emitting diode.

The light combining element 109 is disposed on the transmission path of the excitation beam B from the excitation light source 100 and on a transmission path of the auxiliary beam B' from the auxiliary light source 108. The excitation beam B from the excitation light source 100 and the auxiliary beam B' from the auxiliary light source 108 are combined by the light combining element 109 and transmitted to the beam filter module 101 through a same transmission path (such as a transmission path PA). In this embodiment, the light combining element 109 allows the excitation beam B to pass through and reflects the auxiliary beam B'. However, in other embodiments, the positions of the auxiliary light source 108 and the excitation light source 100 may be reversed, and the light combining element 109 may be designed to allow the auxiliary beam B' to pass through and reflect the excitation beam B.

The auxiliary light source 108 may be turned on in the third period (the period in which the illumination system 10A outputs the red beam), and turned off in other periods. In the third period, the auxiliary beam B' from the auxiliary light source 108 may be transmitted to the light effective region R1 of the beam filter module 101 through the light combining element 109 and a transmissive lens 107 sequentially. In addition to allowing the red beam of the conversion beam B1 from the wavelength conversion module 102 to pass through, the light effective region R1 of the beam filter module 101 may also allow the auxiliary beam B' to pass through. The red beam of the conversion beam B1 and the auxiliary beam B' passing through the light effective region R1 then pass through the homogenizing element 103 and are output from the illumination system 10A. In this way, the red beam provided by the illumination system 10A has better color purity, color rendering, and brightness.

Figure 3:
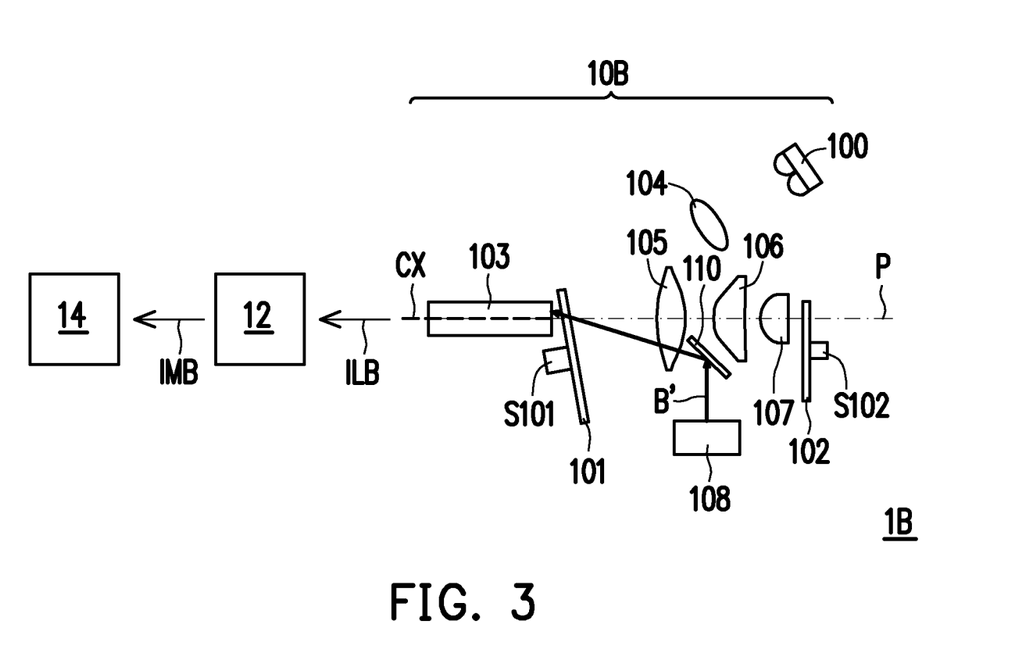
FIG. 3 is a schematic top view of a projection apparatus according to the third embodiment of the disclosure.

FIG. 3 is a schematic top view of a projection apparatus according to the third embodiment of the disclosure. Referring to FIG. 3, the main differences between a projection apparatus 1B of the third embodiment and the projection apparatus 1A of FIG. 2 are described as follows. In the projection apparatus 1B, an illumination system 10B does not include the light combining element 109 of FIG. 2, and the illumination system 10B further includes a dichroic element 110.

The dichroic element 110 is disposed on the transmission path of the auxiliary beam B' from the auxiliary light source 108 and between the beam filter module 101 and the wavelength conversion module 102. In this embodiment, the dichroic element 110 is disposed between the lens 105 and the lens 106, but is not limited thereto. The dichroic element 110 is configured, for example, to reflect the excitation beam (not shown) and the auxiliary beam B' and allow the other beams to pass through. In detail, the dichroic element 110 may be configured to reflect the auxiliary beam B' from the auxiliary light source 108, and the auxiliary beam B' reflected by the dichroic element 110 passes through the light effective region (the light effective region R1 as shown in FIG. 1C) of the beam filter module 101 and enters the homogenizing element 103. In addition, the dichroic element 110 may also be configured to reflect the excitation beam reflected from the wavelength conversion module 102 (for example, the excitation beam that is not converted into the conversion beam by the wavelength conversion module 102 and is reflected by the wavelength conversion module 102 at the third period), so as to avoid the excitation beam that is not converted into the conversion beam by the wavelength conversion module 102 at the third period from being transmitted to the beam filter module 101, thereby improving the color purity of the red beam output from the illumination system 10B.

Figure 4:
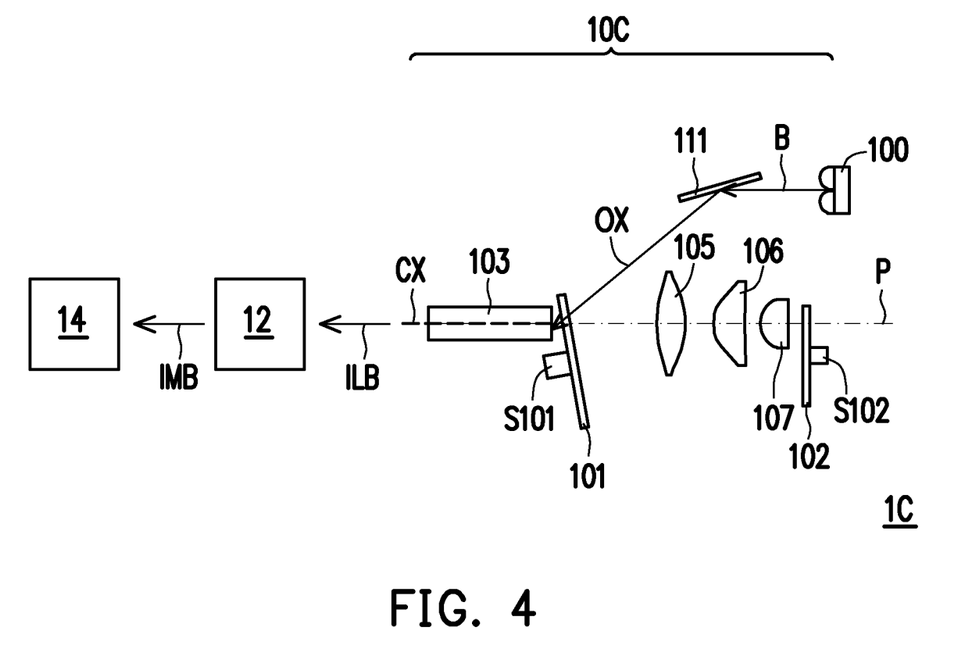
FIG. 4 is a schematic top view of a projection apparatus according to the fourth embodiment of the disclosure.

FIG. 4 is a schematic top view of a projection apparatus according to the fourth embodiment of the disclosure. Referring to FIG. 4, the main differences between a projection apparatus 1C of the fourth embodiment and the projection apparatus 1 of FIG. 1A are described as follows. In the projection apparatus 1C, an illumination system 10C further includes a reflecting mirror 111. The reflecting mirror 111 is located between the excitation light source 100 and the beam filter module 101, and the excitation beam B from the excitation light source 100 is reflected to the beam filter module 101 through the reflecting mirror 111. In addition, the reflecting mirror 111 and the excitation light source 100 are located on one side of the lens 105 to the lens 107, and the reflecting mirror 111 do not overlap with the lens 105 to the lens 107.

Figure 5A:
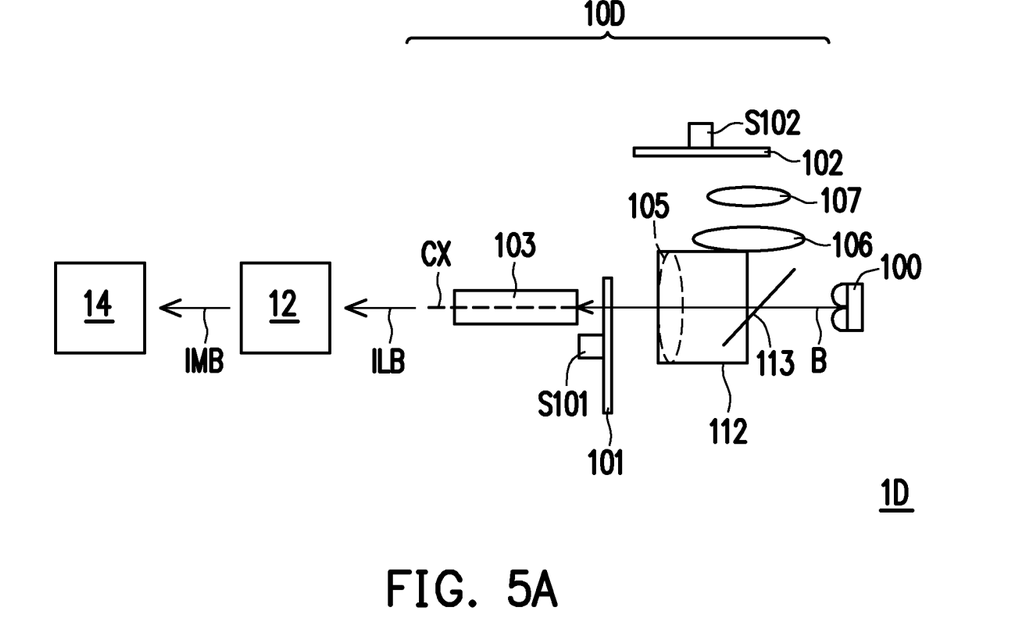
FIG. 5A and FIG. 5B are respectively a schematic top view and a schematic side view of a projection apparatus according to the fifth embodiment of the disclosure in a first period.
Figure 5B:
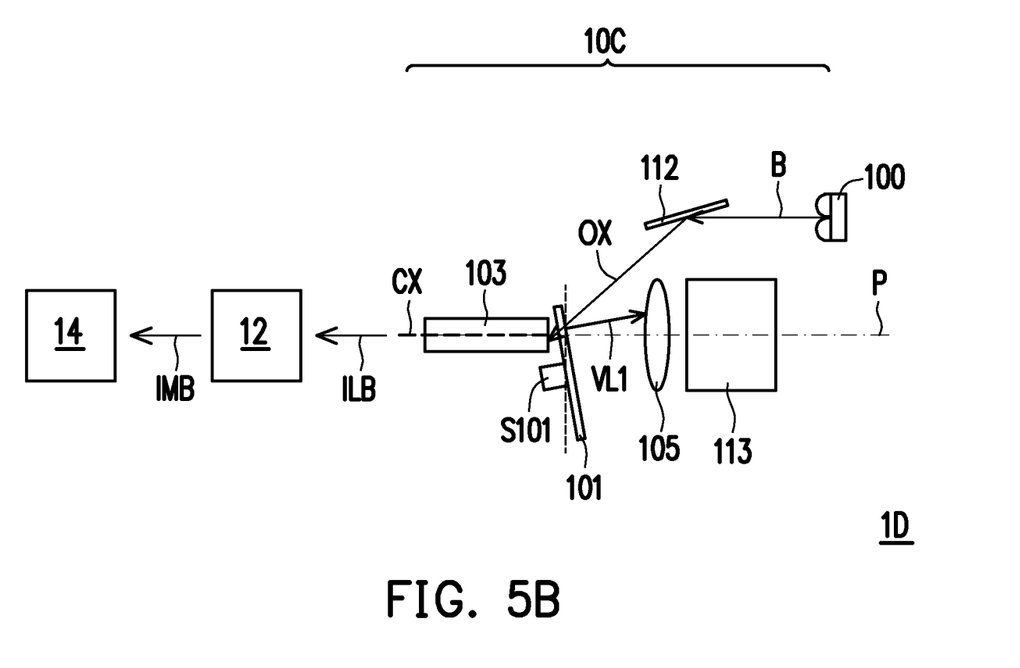
Figure 5C:
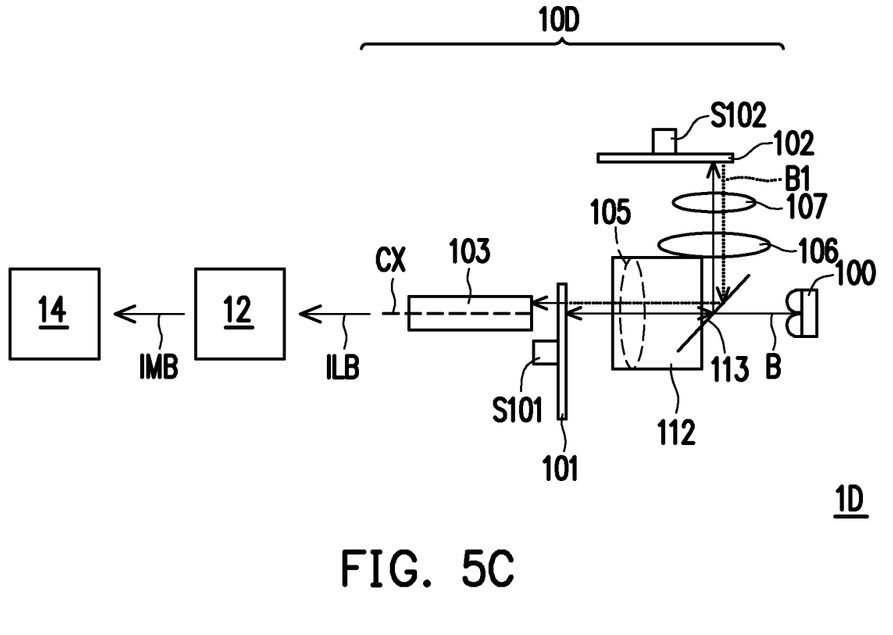
FIG. 5C is a schematic top view of the projection apparatus according to the fifth embodiment of the disclosure in a second period.

FIG. 5A and FIG. 5B are respectively a schematic top view and a schematic side view of a projection apparatus in the first period according to the fifth embodiment of the disclosure. FIG. 5C is a schematic top view of the projection apparatus in the second period according to the fifth embodiment of the disclosure. Referring to FIGS. 5A to 5C, the main differences between a projection apparatus 1D of the fifth embodiment and the projection apparatus 1 of FIG. 1A and FIG. 1B are described as follows. In the projection apparatus 1D, an illumination system 10D may not include the lens 104 in FIG. 1A and FIG. 1B, and the illumination system 10B may further include a first reflecting mirror 112 and a second reflecting mirror 113.

The first reflecting mirror 112 is located between the excitation light source 100 and the beam filter module 101, and the excitation beam B from the excitation light source 100 is transmitted to the beam filter module 101 through the first reflecting mirror 112. The second reflecting mirror 113 is located outside the transmission path of the excitation beam B from the excitation light source 100, that is, outside a transmission path of the excitation beam B between the excitation light source 100 and the beam filter module 101. As shown in FIG. 5B, the second reflecting mirror 113 is not located on the transmission path of the excitation beam B transmitted from the excitation light source 100 to the beam filter module 101, and the second reflecting mirror 113 and the lens 105 are, for example, both located below the first reflecting mirror 112. In addition, as shown in FIG. 5C, the second reflecting mirror 113 is disposed on a transmission path of the excitation beam B reflected by the beam filter module 101 and a transmission path of the conversion beam B1 reflected by the wavelength conversion module 102.

In summary, the embodiments of the disclosure have at least one of the following advantages or effects. In the embodiments of the illumination system and the projection apparatus of the disclosure, the excitation beam from the excitation light source may be transmitted to the wavelength conversion module through the reflection of the light effective region of the beam filter module and converted into the conversion beam by the wavelength conversion module. The conversion beam is transmitted to the light effective region of the beam filter module through the reflection of the wavelength conversion module, and passes through the light effective region of the beam filter module and then forms at least one color light. Since the number of the optical elements configured in the illumination system is effectively reduced, at least one of the problems of difficulty in assembly, poor accuracy, and difficulty in size reduction may be improved. In some embodiments, the illumination system may further include the multiple lenses to converge or collimate the beam. In some embodiments, the illumination system may further include the auxiliary light source to increase the energy of specific color light (such as the red beam) output from the illumination system. In some embodiments, the illumination system may further include the light combining element or the dichroic element to transmit the auxiliary beam from the auxiliary light source to the beam filter module. In some embodiments, the dichroic element may be disposed between the beam filter module and the wavelength conversion module and is designed to reflect the auxiliary beam and the excitation beam to improve the purity of specific color light (such as the red beam) output from the illumination system. In some embodiments, the first reflecting mirror may be configured to replace the lens to transmit the excitation beam from the excitation light source to the beam filter module, and the second reflecting mirror may be configured to replace the dichroic element to transmit the excitation beam reflected by the light effective region of the beam filter module to the wavelength conversion module to reduce the light loss of the excitation beam in the process of being transmitted to the wavelength conversion module or to reduce the volume or weight of the illumination system.

The foregoing description of the preferred of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projection apparatus comprising an illumination system, a light valve and a projection lens, wherein the illumination system is configured to provide an illumination beam, the light valve is disposed on a transmission path of the illumination beam and converts the illumination beam into an image beam, the projection lens is disposed on a transmission path of the image beam, and the illumination system comprises an excitation light source, a beam filter module, a wavelength conversion module and a homogenizing element, wherein the excitation light source is configured to emit an excitation beam;

the beam filter module comprises a light effective region and a light transmissive region, and is configured to rotate around a shaft of the beam filter module, so that the light effective region and the light transmissive region alternately cut into a transmission path of the excitation beam from the excitation light source;

the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam; and the homogenizing element is disposed on a transmission path of the excitation beam passing through the beam filter module, and the beam filter module is obliquely disposed adjacent to the homogenizing element, wherein in a first time period, the excitation beam transmitted to the beam filter module passes through the light transmissive region of the beam filter module and directly passes through the homogenizing element without being transmitted to the wavelength conversion module, in a second time period, the excitation beam transmitted to the beam filter module is reflected by the light effective region of the beam filter module and is transmitted to the wavelength conversion module, the excitation beam is converted into the conversion beam by the wavelength conversion region, the conversion beam is reflected to pass through the light effective region of the beam filter module and then forms at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam.

2. The projection apparatus according to claim 1, wherein the normal line of the light effective region and a normal line of the wavelength conversion region are not parallel nor perpendicular.

3. The projection apparatus according to claim 1, wherein the homogenizing element, the beam filter module, and the wavelength conversion module are arranged on a linear path, and the excitation light source is located outside the linear path.

4. The projection apparatus according to claim 1, wherein the illumination system further comprises:

a plurality of lenses disposed between the beam filter module and the wavelength conversion module, wherein the plurality of lenses are located outside the transmission path of the excitation beam from the excitation light source.

5. The projection apparatus according to claim 1, wherein the illumination system further comprises:

an auxiliary light source configured to emit an auxiliary beam, wherein a wavelength of the auxiliary beam is different from the wavelength of the excitation beam; and a light combining element disposed on the transmission path of the excitation beam from the excitation light source and on a transmission path of the auxiliary beam from the auxiliary light source, wherein the excitation beam from the excitation light source and the auxiliary beam from the auxiliary light source are combined by the light combining element and transmitted to the beam filter module through a same transmission path.

6. A projection apparatus comprising an illumination system, a light valve and a projection lens, wherein the illumination system is configured to provide an illumination beam, the light valve is disposed on a transmission path of the illumination beam and converts the illumination beam into an image beam, the projection lens is disposed on a transmission path of the image beam, and the illumination system comprises an excitation light source, a beam filter module, a wavelength conversion module and a homogenizing element, wherein the excitation light source is configured to emit an excitation beam;

the beam filter module comprises a light effective region and is disposed on a transmission path of the excitation beam from the excitation light source;

the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam; and the homogenizing element is disposed on a transmission path of the excitation beam passing through the beam filter module, the conversion beam from the wavelength conversion module passes through the light effective region of the beam filter module and then forms at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam, wherein the illumination system further comprises:

an auxiliary light source configured to emit an auxiliary beam; and a dichroic element disposed on a transmission path of the auxiliary beam from the auxiliary light source and between the beam filter module and the wavelength conversion module, wherein the dichroic element is configured to reflect the excitation beam and the auxiliary beam and allow other beams to pass.

7. The projection apparatus according to claim 6, wherein the auxiliary beam reflected by the dichroic element passes through the light effective region of the beam filter module and enters the homogenizing element.

8. A projection apparatus comprising an illumination system, a light valve and a projection lens, wherein the illumination system is configured to provide an illumination beam, the light valve is disposed on a transmission path of the illumination beam and converts the illumination beam into an image beam, the projection lens is disposed on a transmission path of the image beam, and the illumination system comprises an excitation light source, a beam filter module, a wavelength conversion module and a homogenizing element, wherein the excitation light source is configured to emit an excitation beam;

the beam filter module comprises a light effective region and is disposed on a transmission path of the excitation beam from the excitation light source;

the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam; and the homogenizing element is disposed on a transmission path of the excitation beam passing through the beam filter module, the conversion beam from the wavelength conversion module passes through the light effective region of the beam filter module and then forms at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam, wherein the illumination system further comprises:

a plurality of lenses disposed between the beam filter module and the wavelength conversion module; and a reflecting mirror located between the excitation light source and the beam filter module, wherein the excitation beam from the excitation light source is transmitted to the beam filter module through the reflecting mirror, wherein the reflecting mirror and the excitation light source are located on one side of the plurality of lenses, and the reflecting mirror do not overlap with the plurality of lenses.

9. A projection apparatus comprising an illumination system, a light valve and a projection lens, wherein the illumination system is configured to provide an illumination beam, the light valve is disposed on a transmission path of the illumination beam and converts the illumination beam into an image beam, the projection lens is disposed on a transmission path of the image beam, and the illumination system comprises an excitation light source, a beam filter module, a wavelength conversion module and a homogenizing element, wherein the excitation light source is configured to emit an excitation beam;

the beam filter module comprises a light effective region and is disposed on a transmission path of the excitation beam from the excitation light source;

the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam; and the homogenizing element is disposed on a transmission path of the excitation beam passing through the beam filter module, the conversion beam from the wavelength conversion module passes through the light effective region of the beam filter module and then forms at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam, wherein the illumination system further comprises:
a first reflecting mirror located between the excitation light source and the beam filter module, wherein the excitation beam from the excitation light source is transmitted to the beam filter module through the first reflecting mirror; and
a second reflecting mirror located outside a transmission path of the excitation beam between the excitation light source and the beam filter module, wherein the second reflecting mirror is disposed on a transmission path of the excitation beam reflected by the beam filter module and on a transmission path of the conversion beam reflected by the wavelength conversion module.

10. The projection apparatus according to claim 1, wherein an angle formed between the normal line of the light effective region and an optical axis of the excitation beam emitted from the excitation light source is not equal to 0.

11. An illumination system configured to provide an illumination beam and comprising an excitation light source, a beam filter module, a wavelength conversion module and a homogenizing element, wherein:
the excitation light source is configured to emit an excitation beam;
the beam filter module comprises a light effective region and a light transmissive region, and is configured to rotate around a shaft of the beam filter module, so that the light effective region and the light transmissive region alternately cut into a transmission path of the excitation beam from the excitation light source;
the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam; and
the homogenizing element is disposed on a transmission path of the excitation beam passing through the beam filter module, and the beam filter module is obliquely disposed adjacent to the homogenizing element, wherein in a first time period, the excitation beam transmitted to the beam filter module passes through the light transmissive region of the beam filter module and directly passes through the homogenizing element without being transmitted to the wavelength conversion module, in a second time period, the excitation beam transmitted to the beam filter module is reflected by the light effective region of the beam filter module and is transmitted to the wavelength conversion module, the excitation beam is converted into the conversion beam by the wavelength conversion region, the conversion beam is reflected to pass through the light effective region to form at least one color light, and the homogenizing element is disposed on a transmission path of the at least one color light,
wherein an optical axis of the excitation beam incident on the light effective region and a normal line of the light effective region are respectively not parallel to a central axis of the homogenizing element, and at least one of the excitation beam and the at least one color light forms the illumination beam.

12. The illumination system according to claim 11, wherein the normal line of the light effective region and a normal line of the wavelength conversion region are not parallel nor perpendicular.

13. The illumination system according to claim 11, wherein the homogenizing element, the beam filter module, and the wavelength conversion module are arranged on a linear path, and the excitation light source is located outside the linear path.

14. The illumination system according to claim 11 further comprising:
a plurality of lenses disposed between the beam filter module and the wavelength conversion module, wherein the plurality of lenses are located outside the transmission path of the excitation beam from the excitation light source.

15. The illumination system according to claim 11 further comprising:
An auxiliary light source configured to emit an auxiliary beam, wherein a wavelength of the auxiliary beam is different from the wavelength of the excitation beam; and
a light combining element disposed on the transmission path of the excitation beam from the excitation light source and on a transmission path of the auxiliary beam from the auxiliary light source, wherein the excitation beam from the excitation light source and the auxiliary beam from the auxiliary light source are combined by the light combining element and transmitted to the beam filter module through a same transmission path.

16. An illumination system configured to provide an illumination beam and comprising an excitation light source, a beam filter module, a wavelength conversion module, a homogenizing element, an auxiliary light source, and a dichroic element, wherein:
the excitation light source is configured to emit an excitation beam;
the beam filter module comprises a light effective region and is disposed on a transmission path of the excitation beam from the excitation light source;
the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam;
the homogenizing element is disposed on a transmission path of the excitation beam passing through the beam filter module, the conversion beam from the wavelength conversion module passes through the light effective region to form at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam;
the auxiliary light source is configured to emit an auxiliary beam; and
the dichroic element is disposed on a transmission path of the auxiliary beam from the auxiliary light source and between the beam filter module and the wavelength conversion module, wherein the dichroic element is configured to reflect the excitation beam and the auxiliary beam and allow other beams to pass.

17. The illumination system according to claim 16, wherein the auxiliary beam reflected by the dichroic element passes through the light effective region and enters the homogenizing element.

18. An illumination system configured to provide an illumination beam and comprising an excitation light source, a beam filter module, a wavelength conversion module, a homogenizing element, a plurality of lenses, and a reflecting mirror, wherein:
- the excitation light source is configured to emit an excitation beam;
- the beam filter module comprises a light effective region and is disposed on a transmission path of the excitation beam from the excitation light source;
- the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam;
- the homogenizing element is disposed on a transmission path of the excitation beam passing through the beam filter module, the conversion beam from the wavelength conversion module passes through the light effective region to form at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam;
- the plurality of lenses are disposed between the beam filter module and the wavelength conversion module; and
- the reflecting mirror are located between the excitation light source and the beam filter module, wherein the excitation beam from the excitation light source is transmitted to the beam filter module through the reflecting mirror,
- wherein the reflecting mirror and the excitation light source are located on one side of the plurality of lenses, and the reflecting mirror do not overlap with the plurality of lenses.

19. An illumination system configured to provide an illumination beam and comprising an excitation light source, a beam filter module, a wavelength conversion module, a homogenizing element, a first reflecting mirror, and a second reflecting mirror, wherein:
- the excitation light source is configured to emit an excitation beam;
- the beam filter module comprises a light effective region and is disposed on a transmission path of the excitation beam from the excitation light source;
- the wavelength conversion module comprises a wavelength conversion region and is disposed on a transmission path of the excitation beam reflected by the light effective region, and the wavelength conversion region is configured to convert the excitation beam into a conversion beam and reflect the conversion beam, wherein a wavelength of the conversion beam is different from a wavelength of the excitation beam;
- the homogenizing element is disposed on a transmission path of the excitation beam passing through the beam filter module, the conversion beam from the wavelength conversion module passes through the light effective region to form at least one color light, and the homogenizing element is disposed on a transmission path of the at least one color light, wherein an optical axis of the excitation beam incident on the light effective region and a normal line of the light effective region are respectively not parallel to a central axis of the homogenizing element, and at least one of the excitation beam and the at least one color light forms the illumination beam;
- the first reflecting mirror is located between the excitation light source and the beam filter module, wherein the excitation beam from the excitation light source is transmitted to the beam filter module through the first reflecting mirror; and
- the second reflecting mirror is located outside a transmission path of the excitation beam between the excitation light source and the beam filter module, wherein the second reflecting mirror is disposed on a transmission path of the excitation beam reflected by the beam filter module and on a transmission path of the conversion beam reflected by the wavelength conversion module.

20. The illumination system according to claim 11, wherein an angle formed between the normal line of the light effective region and an optical axis of the excitation beam emitted from the excitation light source is not equal to 0.

* * * * *